3,282,715
INHIBITED CLAY SLURRY COMPOSITION

Edgar W. Sawyer, Jr., Metuchen, and Michael Pavol, Jr., New Brunswick, N.J., assignors to Minerals & Chemicals Philipp Corporation, Menlo Park, N.J., a corporation of Maryland
No Drawing. Filed Oct. 2, 1963, Ser. No. 313,175
10 Claims. (Cl. 106—72)

This invention relates to dispersed kaolin clay slurries and relates especially to kaolin clay slurries adapted for use in the preparation of compositions for coating or filling paper board for food packaging use.

Kaoline clay is a white, finely divided hydrated aluminum silicate mineral that is widely used as a coating or filler material in the production of paper goods. For such use, the clay is frequently supplied commercially as a concentrated aqueous slurry containing about 70 percent clay solids (i.e., 70 parts by weight clay to 30 parts of water). Alternatively, the clay is slurried at about 70 percent solids in a coating plant. In order to provide high solids clay slurries of sufficient fluidity to be pumped and to permit the formulation of high solids coating compositions, a clay dispersing agent, usually a soluble polyphosphate, must be incorporated into the clay slurry. The dispersed slurry is then mixed with adhesive solutions to provide the coating composition, usually called a "coating color."

High solids kaolin clay slurries usually have a high micro-organism count even when the slurries are freshly prepared. In most instances, the count is increased substantially when the slurries are aged. For example, typical predispersed kaolin slurries have been found to have micro-organism counts appreciably above five million when aged for several weeks. Clay slurries having high micro-organism counts tend to be discolored and odorous and, when used in making board or paper for food packaging, these slurries may cause the board to discolor, and the food to become odorous and have a bad taste. A special problem exists with polyphosphate dispersed slurries containing coating clay that has been brightened as a result of having been treated by froth flotation with a fatty acid collector reagent selective to colored impurities originally in the clay. When high solids slurries of the flotation beneficiated clay are stored, the polyphosphate clay dispersant gradually decreases in effectiveness, as evidenced by the fact that the viscosity of the slurry increases substantially. Thus, a 70 percent solids slurry of flotation beneficiated clay may be very fluid when freshly formulated but semisolid and nonpumpable after it has been stored for a month. Moreover, the slurry may liver and develop a very foul odor during storage. These various undesirable effects we attribute to the action of micro-organisms on the trace quantity of residual fatty acid flotation reagent which is associated with the flotation brightened clay. The action of the micro-organisms on the fatty material is believed to account in some manner for the extremely rapid reversion of the condensed phosphate dispersant to a lower phosphate (orthophosphate) which is not an effective clay dispersant.

Many agents which are extremely effective germicidal agents for other applications are not suitable additives to kaoline slurries adapted for ultimate food board use. For example, it has been found that chlorinating agents adversely affect the color of kaoline slurries. Formaldehyde is a relatively ineffective preservative for kaoline slurries for any appreciable period of time. 2,2'-dihydroxy-5,5'-dichlorodiphenyl methane, a germicide useful in many food processing applications, is surprisingly ineffectual in the presence of kaoline clay when the germicide is used in economical amounts. In effect, the clay deactivates this particular type of germicide. Also ineffective in preserving slurry kaolins are hydroxybenzoic acid, hydroxybenzoic acid esters, benzoic acid and sorbic acid. Copper pentachlorophenate, a powerful germicidal agent, has an off-color that is imparted to a slurry kaolin. Quaternary ammonium compounds, such as the alkylaryl polyether of dimethylbenzylammonium chloride, have been found to be completely unsuitable for use with high solids kaolin slurries. When used in effective proportion, members of this class of germicides increase the viscosity of high solids kaolin slurries to an extent such that the slurries do not have flow properties suitable for pumping. Other germicides adversely affect the adhesives which are mixed with the kaoline slurry in formulating the coating compositions. For example, formaldehyde undesirably reacts with casein adhesives. Other germicides, such as the sodium salt of 2-mercaptobenzothiazole, tend to give slurry kaolins a disagreeable odor which is carried over to a dried film of the slurry kaolin and dried films of coatings. Still other germicides tend to change substantially the pH of the slurry kaolin and, therefore, to create problems in producing finished coating compositions.

Accordingly, an object of this invention is to reduce micro-organisms in a high solids kaolin clay slurry to a negligible amount and to curtail the future growth of micro-organisms therein without adversely affecting slurry viscosity, color, odor and compatibility with other coating ingredients with which it will be used.

A specific object of this invention is the provision of inexpensive means for minimizing the deactivation or reversion of clay dispersing agents in high solids slurries of kaolin clay that has been beneficiated by froth flotation with a fatty acid flotation reagent.

Further objects and features of this invention will be apparent from the description thereof which follows.

According to the present invention an extremely small amount of 3,5-dimethyltetrahydro-1,3,5,2H-thiadiazine-2-thione is incorporated into a concentrated dispersed aqueous slurry of kaolin clay adapted for use in food board manufacture for the purposes of reducing the micro-organism count of the slurry to a negligible amount and curtailing the future growth of micro-organisms in the slurry without adversely affecting viscosity, color and odor of the slurry. In the case of dispersed high solids slurries of flotation beneficiated clay, the presence of this sulfur compound effectuates the action of polyphosphate clay dispersant whereby the fluidity of the slurry is maintained even with prolonged storage of the slurry.

Compositions of the subject invention comprise: water having kaolin clay dispersed therein in amount of about 60 percent to 72 percent by weight, especially 68 percent to 70 percent; a clay dispersing agent, usually a water-soluble alkali metal salt of a condensed phosphate, such as sodium hexametaphosphate, tetrasodium pyrophosphate, sodium tripolyphosphate or the analogous potassium polyphosphates, in amount sufficient to disperse (deflocculate) the slurry (usually 0.1 percent to 0.5 percent of the clay weight); and 3,5-dimethyltetrahydro-1,3,5,2H-thiadiazine-2-thione in amount of about 0.005 percent to 0.05 percent, preferably about 0.01 percent to 0.03 percent, of the weight of the slurry. In other words, the germicide is preferably used in amount of 0.2 to 0.6 pound per ton of the aqueous clay slurry. When the thiadiazine thione compound is used in amount less than about 0.005 percent, the germicide may be ineffective against nonsusceptible organisms. These organisms will subsequently reproduce whereby the reduction in microorganism count as a result of incorporation of the thiadiazine thione compound will be temporary only. When used in excess of about 0.05 percent, the resultant coatings may have an undesirable odor. Slurries containing only water, clay, polyphosphate clay dispersant and thiadiazine thione compound usually have a pH within the range of about 5.5 to about 6.5, depending upon the particular clay and clay dispersing agent that has been used. It is also within the scope of this invention to provide slurries having somewhat higher pH values, say a pH of 7.0 to 7.5, by incorporating a suitable alkali, especially sodium hydroxide of ammonium hydroxide, to increase the effectiveness of the clay dispersing agent.

3,5 - dimethyltetrahydro - 1,3,5,2H - thiadiazine - 2-thione is supplied commercially as a finely divided powder and, in producing micro-organism inhibited slurry kaolins of this invention, it is preferable to dilute the powder before incorporating it into the slurry. This can be done on a commercial basis by forming a 10 percent suspension of the germicide in a dispersed kaolin slurry and metering this slurry into the main body of kaolin slurry. The thiadiazine thione compound can be added to a slurry after it is prepared or the compound can be added to aged slurries. The compound should be incorporated in a slurry of flotation beneficiated clay before the slurry ages to the extent that it becomes nonpourable and/or livered and odoriferous. However, untreated aged slurries of flotation beneficiated clay that have become excessively viscous with standing can be reclaimed by adding more clay dispersant as well as the thiadiazine thione compound.

In accordance with a form of this invention, the thiadiazine thione compound is incorporated at ambient temperature into a kaolin slurry that has previously been sterilized by pasteurization at about 180° F.

The invention is illustrated by the following examples.

EXAMPLE I

Seventy percent solids dispersed slurries of commercial paper coating grades of kaolin clay were treated with different concentrations of 3,5-dimethyltetrahydro-1,3,5,2H-thiadiazine-2-thione and the slurries examined for micro-organism count, color and odor, effect on pH and effect on standard coating compositions.

One slurry, referred to hereinafter as "Slury A," was made by stirring 70.0 parts by weight of a commercial spray dried paper coating grade of kaolin clay containing 0.35 percent by weight of tetrasodium pyrophosphate (TSPP) into 30.0 parts by weight of water. The other slurry, referred to as "Slury B," was a commercial 70 percent solids slurry of flotation beneficiated kaolin clay. Slurry B was obtained by subjecting a water-fractioned, fine size fraction of Georgia kaolin clay to the froth flotation procedure of U.S. 2,990,958 to E. W. Greene et al., using a mixture of crude tall oil, oil soluble petroleum sulfonate and fuel oil as reagents to float colored impurities (principally a titaniferous impurity) from the clay. The flotation tailing, which was an aqueous concentrate of brightened clay, was flocculated by addition of sulfurous acid, bleached with zinc hydrosulfite, thickened, filtered to produce a filter cake of about 50 percent clay solids, and the filter cake washed with water. TSPP dispersing agent was added to the filter cake in amount of 0.35 percent of the clay weight in order to fluidize the cake. The solids content of this slurry was then adjusted to about 70.0 percent by addition of a suitable quantity of dried flotation beneficiated kaolin clay that already contained TSPP in amount of 0.35 percent by weight. The details of the process for producing Slurry B are described in Bulletin No. M4-B117, entitled "Ultraflotation," by Denver Equipment Company, 1400 17th Street, Denver, Colorado.

Various quantities of 3,5 dimethyltetrahydro-1,3,5,2H-thiadiazine - 2 - thione were incorporated into portions of Slurry A immediately after the slurry was prepared by mixing the additive in the slurry for at least five minutes at room temperatures. Each slurry was stored in a capped sterile bottle for about three days at about 70° F. A total microorganism count was then made on the untreated slurry and on slurries containing various quantities of the thiadiazine-2-thione compound in accordance with TAPPI Standard T631-M-57. The counts were made after incubation at 32° C. for 48 hours. The procedure was repeated with a freshly prepared sample of Slurry B. Since kaolins which are supplied commercially in slurry form are usually aged about a month before actual use in a coating plant, the procedure was repeated with a month old sample of a 70 percent solids slurry of flotation beneficiated kaolin from the same plant from which Slurry B was obtained.

Total micro-organism counts of the several slurries are reported in Table I. Data in this table show that 0.01 percent to 0.025 percent of the thiadiazine thione compound reduced the count of Slurry A from a value of over a million and a half to negligible values. Data in Table I for Slurry B show that the compound reduced the count of the freshly prepared and aged slurries from values in excess of six million to a negligible value. While the count on the aged slurry without germicide was somewhat less than the count on the fresh uninhibited slurry, the discrepancy was considered to be within experimental error.

The effect of the thiadiazine thione additive upon the pH, color and odor of Slurry A and Slurry B was determined with the results summarized in Table II. In each case, the germicide was incorporated into a freshly prepared slurry. Properties were evaluated immediately after the germicide was incorporated and also after the germicide had been incorporated and the slurry aged for three weeks in a closed nonsterile container at an ambient temperature of about 70° F.

Data in Table II show that when the germicide was incorporated into the freshly prepared slurries in amount within the range of from about 0.01 percent to 0.025 percent by weight, the germicide was substantially without effect on pH, color or odor, even after the slurries were stored. When used in amounts of 0.075 percent to 0.100 percent of the slurry weight, the additive increased pH of the slurry and also imparted an objectionable odor to the slurries.

Coating compositions were made with Slurry A and Slurry B after a freshly prepared slurry had been treated with the thiadiazine thione compound and then aged for a month prior to being made into coating compositions. For purposes of comparison, coating compositions were made up with Slurry A and Slurry B after each had been aged for a month without addition of thiadiazine thione compound. The starch coating color was made up at 55 percent solids and contained 18 pounds of adhesives per 100 pounds of clay and was made by mixing 492 parts by weight of the dispersed slurry kaolin at 70 percent solids with 216 parts by weight of a 25 percent solution of cooked cornstarch (Stayco-M). The casein coating color was at 50 percent solids and contained 14 pounds of adhesive per 100 pounds of clay. This coating color was made by mixing 429 parts by weight of 70 percent solids kaolin slurry, 45 parts by weight distilled water and 210 parts by weight of a 20 percent casein solution obtained by cooking M-50 casein at 140° F. for fifteen minutes and adjusting the pH to 9.0 with ammonia.

Table III summarizes properties of the coating compositions made with the inhibited and uninhibited clay slurries. Data in Table III show that 0.05 percent to 0.10 percent thiadiazine thione inhibitor had little effect on pH, viscosity, color and odor of cooked starch and casein coating colors made with slurry kaolins.

Similar tests were conducted with an enzyme converted starch coating color composition with generally similar results. Tests were also run to determine whether the germicide poisoned the enzyme. The results were negative.

EXAMPLE II

The following data illustrate that the incorporation of small amounts of 3,5-dimethyltetrahydro-1,3,5,2H-thiadiazine-2-thione into a concentrated polyphosphate dispersed slurry of flotation beneficiated kaolin clay curtailed viscosity buildup in the slurry when the slurry was aged. A sample of freshly prepared Slurry B containing 70 percent clay solids and containing 0.35 percent TSPP (based on the clay weight) was divided into two portions. The thiadiazine thione compound was incorporated into one portion of this slurry in amount of 0.02% of the slurry weight. The apparent viscosity of each slurry was measured with a Brookfield Viscometer. The slurries were then stored without agitation for one month at ambient temperature of about 70° F. to 80° F. in closed nonsterile metal containers. The viscosities of the two slurries were again measured.

Apparent viscosity of each slurry was evaluated at shear rates of 10, 20, 50 and 100 r.p.m., since apparent slurry viscosity at such shear rates is considered to be of significance in paper coating production. An appropriate spindle was used for each viscosity range that was measured. Before measuring viscosity, each slurry was mixed for ten minutes with a propeller-type mixer since such slurries are usually similarly agitated before being pumped in coating plants.

The results are summarized in Table IV.

*Table I*

MICRO-ORGANISM CONTENT OF INHIBITED KAOLIN SLURRIES (COUNTS/ML.)

| Slurry | Germicide [1] Weight Percent [2] | Total Count [3] |
|---|---|---|
| A (fresh) | None (control) | 1.61 MM |
| Do | 0.01 | 100 |
| Do | 0.02 | 400 |
| Do | 0.025 | 200 |
| B (fresh) | None (control) | 6.8 MM |
| Do | 0.01 | 50 |
| Do | 0.02 | 30 |
| B (aged 1 month) | None (control) | 6.4 MM |
| Do | 0.015 | 20 |
| Do | 0.025 | 400 |

[1] 3,5-dimethyltetrahydro-1,3,5,2H-thiadiazine-2-thione.
[2] Based on the weight of the slurry.
[3] $M = 1 \times 10^3$; $MM = 1 \times 10^6$.

*Table II*

PHYSICAL PROPERTIES OF INHIBITED 70 PERCENT CLAY SLURRIES

| Slurry | Germicide,[1] Weight Percent | pH Initial | pH 3 Weeks | Reflectance at 457 mu After 3 Weeks | Odor of Dried Drawn-down (3 mil. film) |
|---|---|---|---|---|---|
| A | [2] 0 | 6.1 | 5.7 | 80.70 | None. |
| A | 0.01 | 6.1 | 6.2 | 80.60 | Do. |
| A | 0.025 | 6.1 | 6.3 | 80.64 | Do. |
| A | 0.050 | 6.1 | 6.5 | 81.00 | Do. |
| A | 0.075 | 6.1 | 6.6 | 81.30 | Trace. |
| A | 0.100 | 6.2 | 6.7 | 81.03 | Odor. |
| B | 0 | 6.1 | 6.0 | 85.40 | None. |
| B | 0.01 | 6.2 | 6.2 | 85.90 | Do. |
| B | 0.05 | 6.4 | 6.5 | 86.26 | Do. |

[1] 3,5-dimethyltetrahydro-1,3,5,2H-thiadiazine-2-thione.
[2] Control.

*Table III*

PROPERTIES OF TYPICAL CLAY COATING COMPOSITIONS CONTAINING GERMICIDAL [1] INHIBITED KAOLIN SLURRIES

| Adhesive | Clay Slurry | pH | App. Visc. c.p. (Fann) | Reflectance at 457 mu | Odor of Dried Drawn-down |
|---|---|---|---|---|---|
| Casein | A (control) | 9.20 | 285 | 80.65 | None. |
| Do | A with 0.05% Germicide | 9.20 | 300 | 79.50 | Do. |
| Do | A with 0.10% Germicide | 9.20 | 300 | 77.00 | Do. |
| Do | B (control) | 9.50 | 235 | 84.75 | Do. |
| Do | B with 0.05% Germicide | 9.30 | 285 | 83.90 | Do. |
| Do | B with 0.10% Germicide | 9.30 | 270 | 83.00 | Do. |
| Starch | B (control) | | | 85.50 | Do. |
| Do | B with 0.05% Germicide | | | 85.00 | Do. |
| Do | B with 0.10% Germicide | | | 86.00 | Do. |
| Do | A-90 (control) | | | 80.25 | Do. |
| Do | A-90 with 0.05% Germicide | | | 81.25 | Do. |
| Do | A-90 with 0.10% Germicide | | | 80.75 | Do. |

[1] 3,5-dimethyltetrahydro-1,3,5,2H-thiadiazine-2-thione.

Data in Table IV show that the apparent viscosity of the polyphosphate dispersed slurry of flotation beneficiated kaolin clay increased from twenty to fifty times (depending on rate of shear at which viscosities were evaluated) when the slurry was stored for a month without thiadiazine thione compound. While the presence of thiadiazine thione compound had no effect on the viscosity of freshly prepared slurry, the presence of thiadiazine thione decreased viscosity buildup in the aged slurry by about 50 percent. In effect, degradation of the effect of the polyphosphate dispersant was halved by incorporating thiadiazine thione compound into the slurry of flotation beneficiated clay.

As used hereinabove and in the appended claims, the term "clay weight" refers to the moisture free clay weight which is determined by heating the clay to essentially constant weight at 225° F.

*Table IV*

EFFECT OF GERMICIDE [1] ON VISCOSITY CHANGE IN POLYPHOSPHATE DISPERSED 70 PERCENT SOLIDS SLURRY OF FLOTATION BENEFICIATED KAOLIN CLAY

| Rate of Shear, r.p.m. | Untreated Slurry Freshly Prepared, Viscosity, c.p.[2] | Untreated Slurry After Storage, Viscosity, c.p.[3] | Slurry Containing 0.02 Percent Germicide Freshly Prepared, Viscosity, c.p.[2] | Slurry Containing 0.02 Percent Germicide After Storage, Viscosity, c.p.[4] |
|---|---|---|---|---|
| 10 | 500 | 24,000 | 500 | 12,000 |
| 20 | 350 | 14,000 | 350 | 7,000 |
| 50 | 240 | 6,800 | 240 | 4,000 |
| 100 | 200 | 4,200 | 180 | 2,160 |

[1] 3,5-dimethyltetrahydro-1,3,5,2H-thiadiazine-2-thione.
[2] Measured with No. 2 spindle.
[3] Measured with No. 6 spindle.
[4] Measured with No. 5 spindle.

We claim:

1. A fluid clay slurry comprising a concentrated aqueous dispersion of kaolin clay dispersing agent, and 3,5-dimethyltetrahydro-1,3,5,2H-thiadiazine-2-thione in amount sufficient to reduce substantially the quantity of microorganisms in said slurry but insufficient to affect the color and odor of said slurry.

2. The composition of claim 1 in which said 3,5-dimethyltetrahydro-1,3,5,2H-thiadiazine-2-thione is present in amount of about 0.005% to about 0.05% based on the weight of said slurry.

3. The composition of claim 1 in which said 3,5-dimethyltetrahydro-1,3,5,2H-thiadiazine-2-thione is present in amount of about 0.01% to about 0.03% based on the weight of said slurry.

4. A clay slurry comprising water having kaolin clay dispersed therein at about 70% clay solids, a polyphosphate clay dispersing agent, and a germicide-effective quantity of 3,5-dimethyltetrahydro-1,3,5,2H-thiodiazine-2-thione, said germicide-effective quantity being insufficient to affect substantially the color and odor of said slurry.

5. The composition of claim 4 in which said 3,5-dimethyltetrahydro-1,3,5-2H-thiadiazine-2-thione is present in amount of about 0.01% to about 0.03% based on the weight of said slurry.

6. A method for inhibiting micro-organisms in a dispersed high solids slurry of kaolin clay without impairing the viscosity, color and flow properties thereof which comprises incorporating a small amount of 3,5-dimethyltetrahydro-1,3,5,2H-thiadiazine-2-thione into said slurry.

7. A viscosity stabilized clay composition in the form of a concentrated flowable aqueous slurry and comprising water, a high concentration of flotation brightened kaolin clay containing trace amount of residual fatty acid flotation reagent, a polyphosphate clay dispersing agent and a small amount of 3,5-dimethyltetrahydro-1,3,5,2H-thiadiazine-2-thione as a viscosity stabilizing agent.

8. A viscosity stabilized clay composition in the form of a concentrated flowable aqueous slurry and comprising water, flotation brightened kaolin clay containing trace amount of residual flotation reagent, a polyphosphate clay dispersing agent and from 0.01% to 0.03%, based on the weight of said composition, of 3,5-dimethyltetrahydro-1,3,5,2H-thiadiazine-2-thione, said kaolin clay being dispersed in said slurry in amount such that said slurry would be nonflowable in the absence of said dispersing agent.

9. The composition of claim 8 wherein the clay solids content is about 70% by weight.

10. A method for stabilizing the viscosity of a concentrated aqueous slurry of flotation brightened kaolin clay containing an alkali metal salt polyphosphate as a dispersing agent for said clay, said clay containing trace amounts of residual fatty acid flotation reagent, which method comprises incorporating a small amount of 3,5-dimethyltetrahydro-1,3,5,2H-thiadiazine-2-thione with said slurry substantially immediately after said slurry is prepared.

References Cited by the Examiner
UNITED STATES PATENTS

| 2,838,389 | 6/1958 | Yoder | 260—243 |
|---|---|---|---|
| 3,093,603 | 6/1963 | Gilchuist | 106—15 |
| 3,215,596 | 11/1965 | Moyle | 106—15 |

TOBIAS E. LEVOW, *Primary Examiner.*

S. E. MOTT, *Assistant Examiner.*

UNITED STATES PATENT OFFICE
CERTIFICATE OF CORRECTION

Patent No. 3,282,715 November 1, 1966

Edgar W. Sawyer, Jr. et al.

It is hereby certified that error appears in the above numbered patent requiring correction and that the said Letters Patent should read as corrected below.

Column 1, lines 15, 67 and 69, column 2, line 2, for "kaoline" read -- kaolin --; column 6, Table III, column 5, under the heading, "Reflectance at 457 mu", line 11, for "81,25" read -- 81.25 --; column 7, line 2, for "dispersion of kaolin clay dispersing agent" read -- dispersion of kaolin clay, a clay dispersing agent --.

Signed and sealed this 5th day of September 1967.

(SEAL)
Attest:

ERNEST W. SWIDER
Attesting Officer

EDWARD J. BRENNER
Commissioner of Patents